United States Patent [19]
Cullen et al.

[11] Patent Number: 5,633,796
[45] Date of Patent: May 27, 1997

[54] METHOD AND APPARATUS FOR INFERRING ENGINE OIL TEMPERATURE FOR USE WITH AN OIL CHANGE INDICATOR

[75] Inventors: Michael J. Cullen, Northville; Stephen B. Zulczyk, Novi, both of Mich.

[73] Assignee: Ford Motor Company, Dearborn, Mich.

[21] Appl. No.: 353,605

[22] Filed: Dec. 12, 1994

[51] Int. Cl.$^6$ ............................................... F01M 11/00
[52] U.S. Cl. .................... 364/424.035; 340/449; 340/457.4; 340/438
[58] Field of Search ............... 364/424.03, 424.04, 364/550; 73/10; 340/450.3, 438, 439, 457.4, 449

[56] References Cited

U.S. PATENT DOCUMENTS

| | | |
|---|---|---|
| 4,497,200 | 2/1985 | Tournier ................................. 340/438 |
| 4,506,337 | 3/1985 | Yasuhara ............................. 364/424.03 |
| 4,706,193 | 11/1987 | Imajo et al. ......................... 364/424.03 |
| 4,742,476 | 5/1988 | Schwartz et al. ................... 364/424.03 |
| 4,796,204 | 1/1989 | Inoue .................................... 340/438 |
| 4,847,768 | 7/1989 | Schwartz et al. .................... 340/457.4 |
| 4,970,492 | 11/1990 | King ................................... 364/424.03 |
| 5,060,156 | 10/1991 | Vajgart et al. ...................... 364/424.03 |
| 5,182,720 | 1/1993 | Beck et al. .......................... 364/424.03 |
| 5,382,942 | 1/1995 | Raffa et al. ............................. 340/439 |

*Primary Examiner*—Gary Chin
*Attorney, Agent, or Firm*—Peter Abolins; Roger L. May

[57] ABSTRACT

An electronic engine controller infers the instantaneous temperature of lubricating oil in an engine by determining a steady state oil temperature value as a function of engine speed and aircharge, determining an oil temperature time constant as a function of mass air flow rate and determining the instantaneous oil temperature as a function of the steady state oil temperature and the oil temperature time constant. The engine controller also determines an oil change interval as a function of the inferred oil temperature and the number of engine revolutions.

12 Claims, 7 Drawing Sheets

5,633,796

METHOD AND APPARATUS FOR INFERRING ENGINE OIL TEMPERATURE FOR USE WITH AN OIL CHANGE INDICATOR

FIELD OF THE INVENTION

This invention relates to the field of electronic engine control and more particularly to techniques for determining the temperature and quality of lubricating oil within an internal combustion engine.

BACKGROUND OF THE INVENTION

As most vehicle owners know, engine lubricating oil plays an important role in the proper operation of a vehicle engine. Not only does lubricating oil provide lubrication for the valvetrain and other moving parts in the engine, it also plays an important role in dissipating heat generated by the engine, as well as cleaning moving engine parts. As most vehicle owners are also aware, engine oil requires periodic changing in order to maintain proper engine operation. Heat and impurities in the engine cause the oil, and the additives often contained in the oil, to become dirty and to break down, resulting in reduced lubrication and cleaning ability.

Suggested engine oil change intervals vary depending primarily on the manner in which the vehicle is driven and the conditions under which it is driven. It is known that engine oil temperature contributes significantly to the useful life of the oil. Cold oil temperatures and high oil temperatures both reduce the useful operating life of oil, while a temperature within a certain range provides the longest useful oil life. Thus, as can be seen, harsh operating environments such as extreme cold or extreme heat decrease engine oil life, as does extended operation at high speeds or loads. U.S. Pat. No. 5,060,156 entitled *Method and Apparatus for Determining Engine Oil Change Intervals According to Actual Engine Use*, to Vajgart et al. describes a system which determines an oil change interval as a function of engine oil temperature.

Known methods of determining oil temperature typically utilize a mechanism, similar to that utilized by Vajgert et al., which employs an oil temperature sensor which transmits a signal indicative of the oil temperature to a control module. The temperature sensor however, imposes an added cost to the engine. Moreover, the temperature sensed by the oil temperature sensor is not always accurate. Accurate determination of engine oil change interval accordingly suffers, engine performance and operational life decrease as a result.

Consequently, there is a need for a system which provides low cost and reliable determinaton of engine oil temperature.

SUMMARY OF THE INVENTION

It is an object of the present invention to provide an accurate determination of engine oil temperature.

In accordance with the primary object of the invention, an engine oil temperature is determined by determining a steady state oil temperature value as a function of an engine speed value which is indicative of the rotational speed of the engine, and an aircharge value which is indicative of aircharge in lbs per cylinder filling. A time constant value, which is indicative of the rate of change of oil temperature in the engine, is then determined as a function of an airmass value, which is indicative of the mass flow rate of air into an intake manifold of the engine. The temperature of the oil is then determined as a function of the steady state oil temperature value and the time constant value.

An advantage of certain preferred embodiments is that oil temperature is accurately determined without the need for a sensor. As a result the engine oil temperature is determined in a reliable manner and cost of the system is reduced by eliminating the need for an engine oil temperature sensor.

These and other features and advantages of the present invention may be better understood by considering the following detailed description of a preferred embodiment of the invention. In the course of this description, reference will frequently be made to the attached drawings.

DETAILED DESCRIPTION

Figure 1:
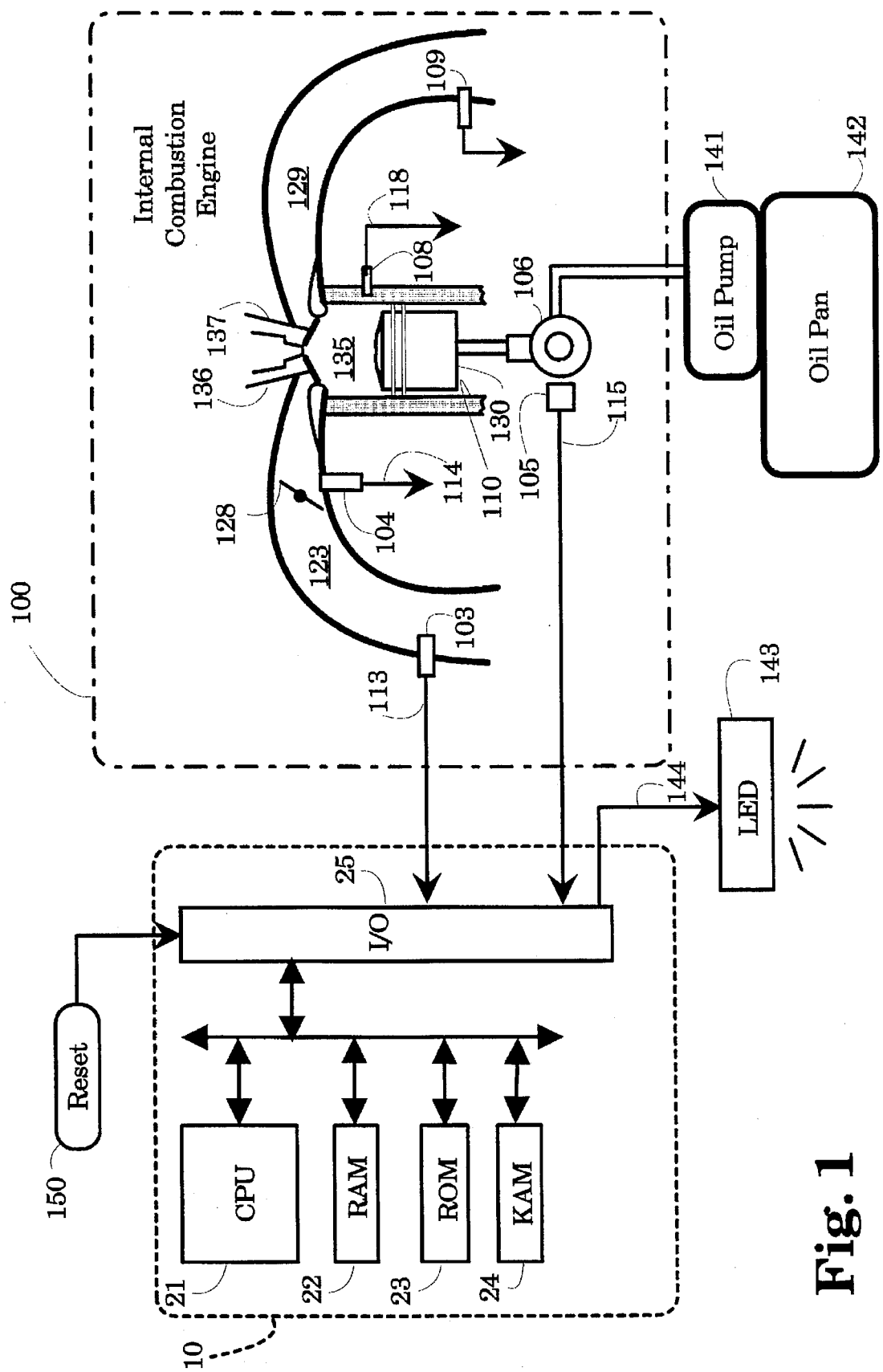
FIG. 1 of the drawings shows a schematic diagram of a preferred embodiment of portions of an internal combustion engine and a electronic engine controller which utilizes the principles of the invention.

FIG. 1 of the drawings shows an Electronic Engine Controller (EEC) 10 and an internal combustion engine 100. Engine 100 draws an aircharge through an intake manifold 123, past a throttle plate 128, and intake valve 136 and into combustion chamber 135. An air/fuel mixture which consists of the aircharge and fuel, is ignited in combustion chamber 135, and exhaust gas produced from combustion of the air/fuel mixture is transported past exhaust valve 137 through exhaust manifold 129. A piston 130 is coupled to a crankshaft 106, and moves in a linear fashion within a cylinder defined by cylinder walls 110. An oil pump 141 pumps engine oil from an oil pan 142 via oil channels in the valvetrain, piston and crankshaft. The engine oil lubricates cylinder walls 110 to facilitate movement of piston 109, and to dissipate heat from cylinder walls 110 and piston 109 caused by combustion of the air/fuel mixture in the combustion chamber 135.

A crankshaft position sensor 105 detects the rotation of crankshaft 106 and transmits a crankshaft position signal 115 to EEC 10. Crankshaft position signal 115 preferably takes the form of a series of pulses, each pulse being caused by the rotation of a predetermined point on the crankshaft past sensor 105. The frequency of pulses on the crankshaft position signal 115 are thus indicative of the rotational speed of the engine crankshaft. A Mass AirFlow (MAF) sensor 103 detects the mass flow rate of air into intake manifold 123 and transmits a representative signal 113 to EEC 10. MAF sensor 103 preferably takes the form of a hot wire anemometer. A throttle position sensor 104 detects the angular position of throttle plate 128 and transmits a representative signal 114 EEC 10. Throttle position sensor 104 preferably takes the form of potentiometer. An engine coolant temperature sensor 108 detects the temperature of engine coolant circulating within the engine and transmits a representative signal 118 to EEC 10. Engine coolant temperature sensor 108 preferably takes the form of thermistor.

A visual indicator 143 which preferably takes the form of a light emitting diode (LED) or light bulb provides a visual indication to an operator of the vehicle of expiration of an oil change interval. LED 143 operates under control of oil change signal 144 which is generated by EEC 10 in a manner to be described. An oil change reset button 150 is operable by the vehicle operator to provide an indication to EEC 10 of the start of a new oil change interval. The oil change reset button 150 is preferably actuated when the engine oil is changed in order to provide an accurate indication to EEC 10 of the beginning of an oil change interval. EEC 10 determines the expiration of the oil change interval and provides an indication to the vehicle operator, via LED 143. The visual indication provided by LED 143 informs the vehicle operator of the need for an oil change.

EEC 10 includes a central processing unit (CPU) 21 for executing stored control programs, a read-only memory (ROM) 23 for storing the control programs, a random-access memory (RAM) 22 for temporary data storage, a keep-alive-memory (KAM) 24 for storing learned values, a conventional data bus and I/O ports 25 for transmitting and receiving signals to and from the engine 100 and other systems in the vehicle.

Figure 2:
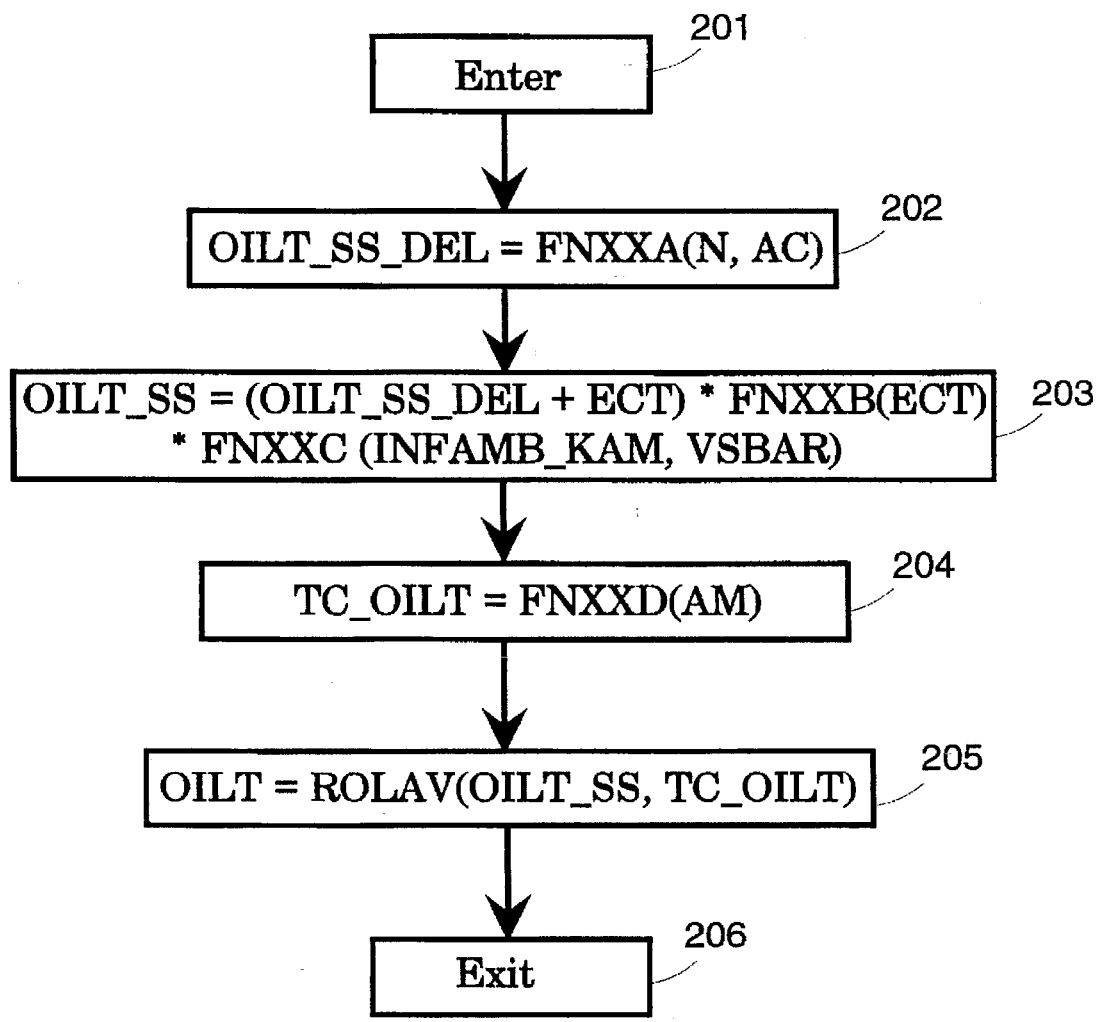
FIGS. 2, 3(a), 3(b), 4(a) and 4(b) are flowcharts showing the steps performed by a preferred embodiment.
Figure 3A:
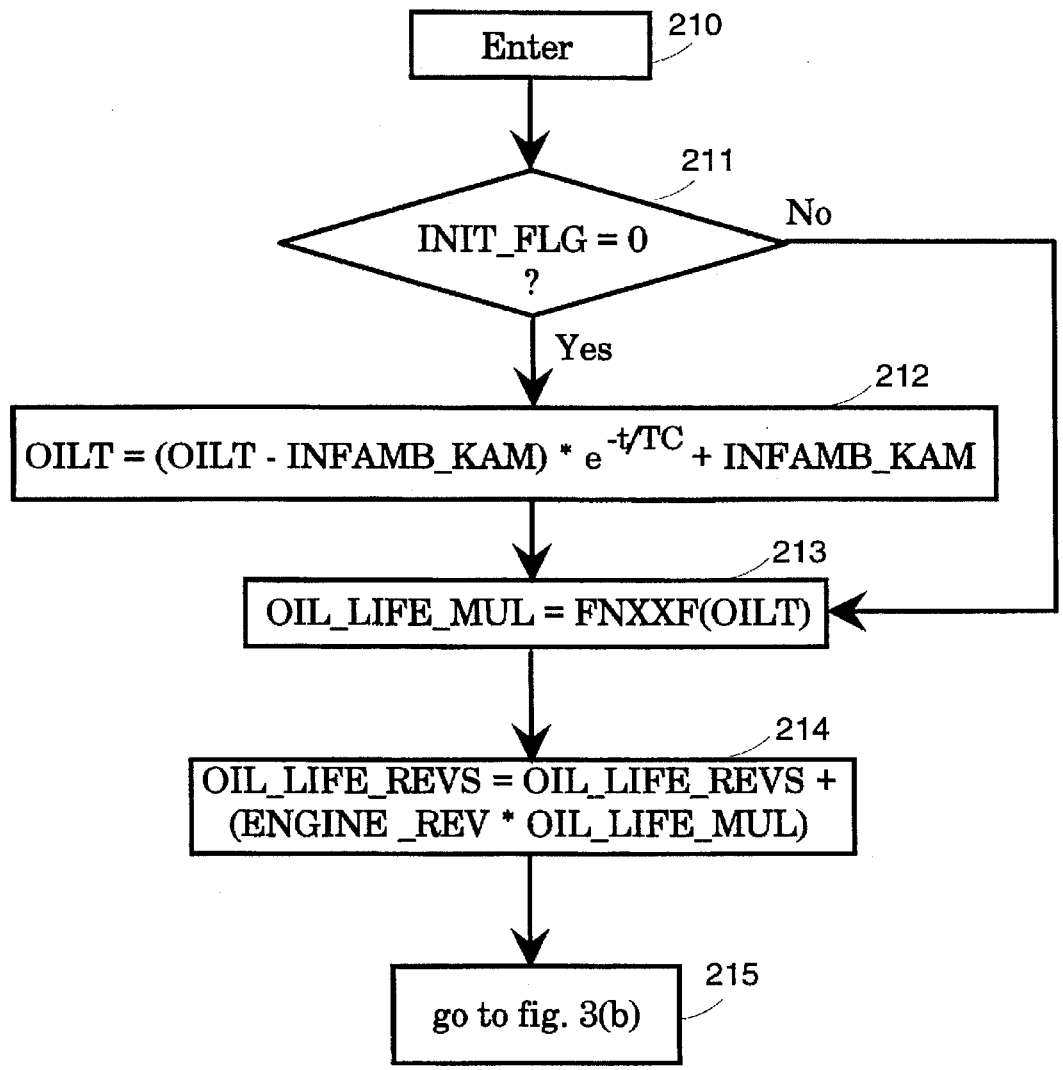
Figure 3B:
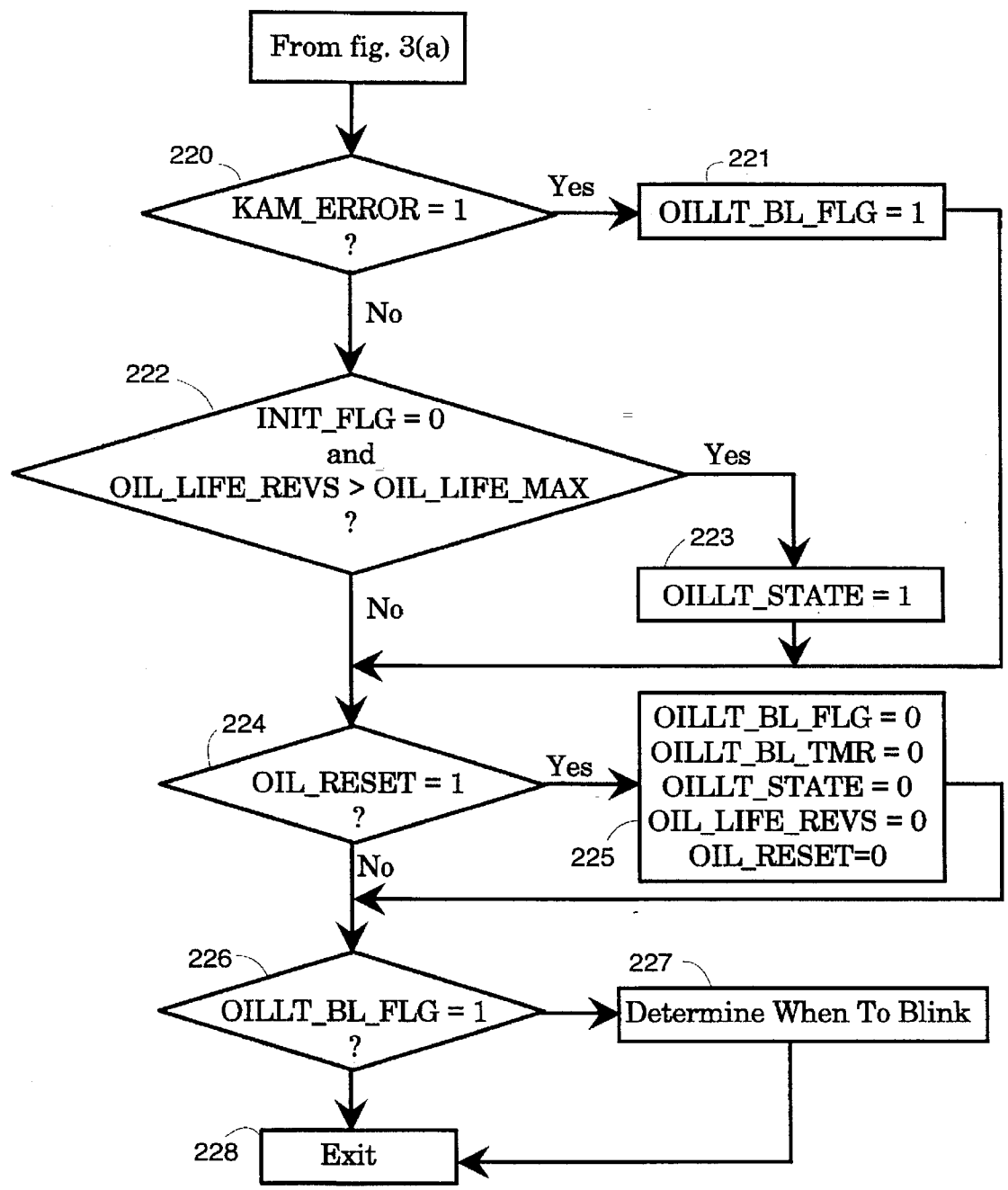
Figure 4A:
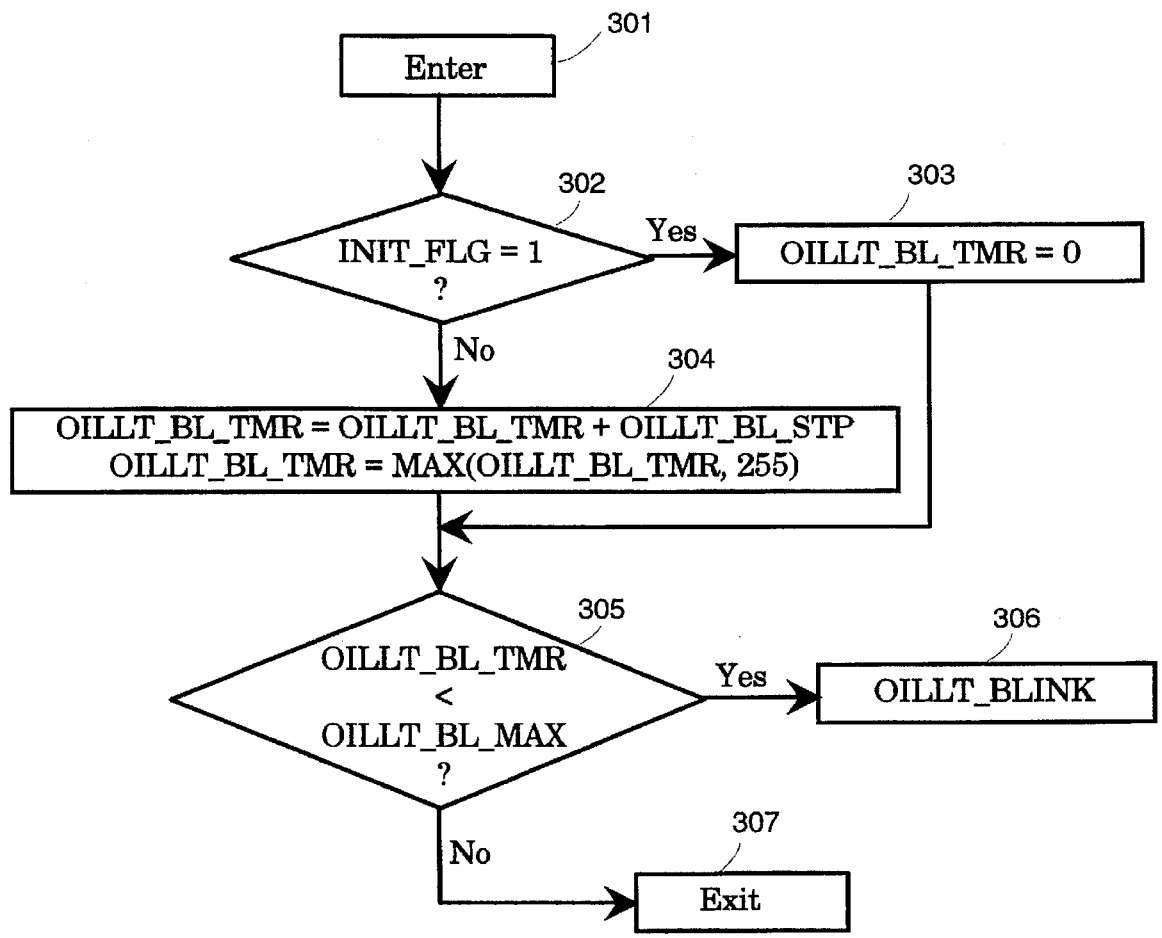
Figure 4B:
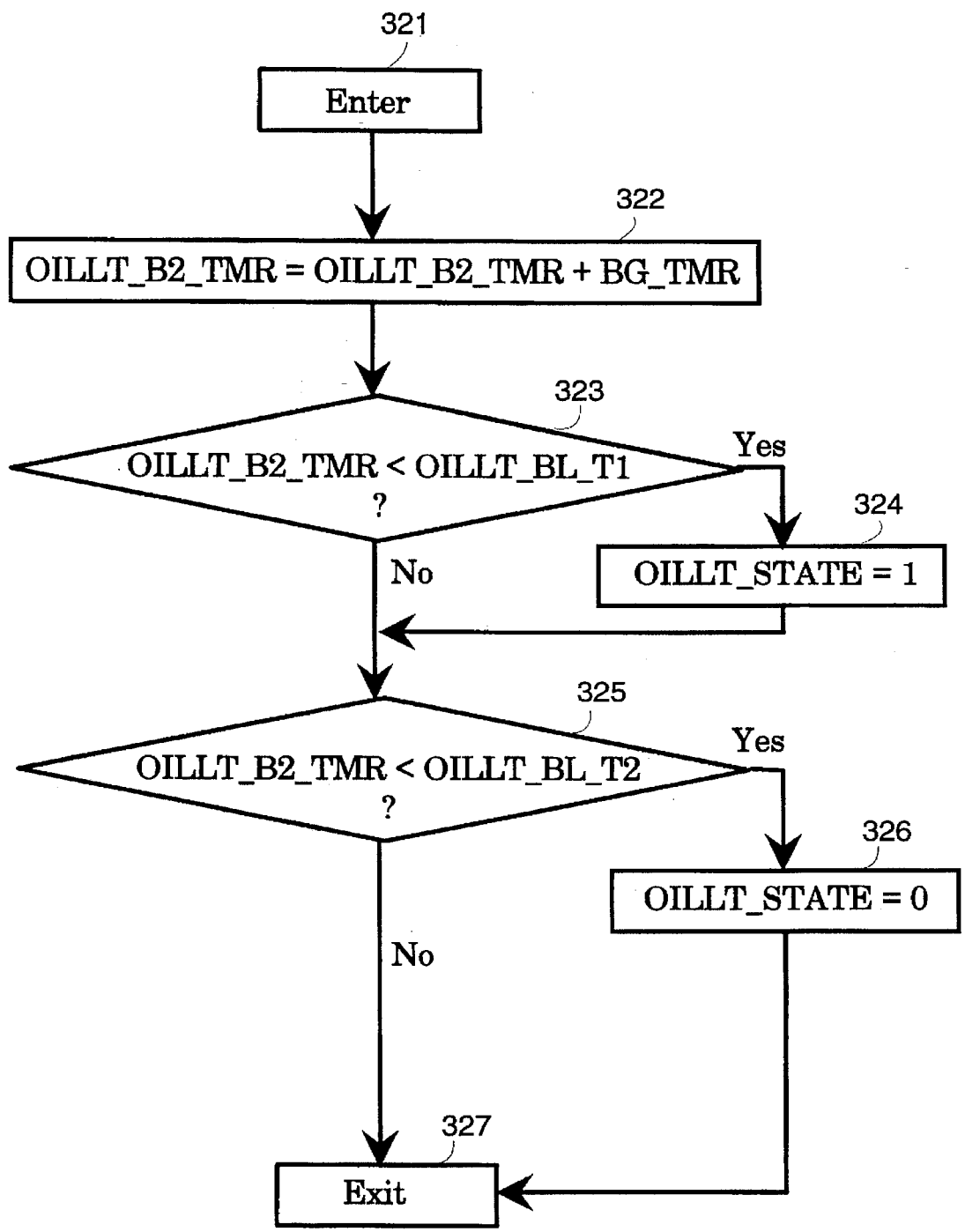

The oil temperature is determined according to the steps shown in FIG. 2, and the oil change interval is determined according to the steps shown in FIGS. 3, 4(a) and 4(b)

A preferred embodiment advantageously determines the oil temperature in engine 100 in an accurate manner without the need for an oil temperature sensor by executing an oil temperature routine as shown in FIG. 2. The oil temperature routine is preferably executed periodically during engine operation, as part of a background routine which executes substantially continuously during engine operation. The instantaneous oil temperature value OILT generated by the routine is advantageously stored in KAM 24 for use during subsequent engine operation.

The oil temperature routine is initiated at 201 and at 202, a steady state difference value OILT_SS_DEL is calculated as a function of an engine speed value N which is indicative of the rotational speed of the engine, and an aircharge value AC which is indicative of aircharge in pounds per cylinder filling. Engine speed value N is generated as a function of the crankshaft position signal and the aircharge value AC is generated as a function of the MAF signal. OILT_SS_DEL is advantageously generated by retrieving the steady state difference value from a two-dimensional difference table which contains a plurality of empirically derived steady state difference values indexed by engine speed value N and aircharge value AC. Each stored steady state difference value is indicative of a difference between steady state engine oil temperature, at a particular engine speed and aircharge, and an engine coolant temperature of 200 degrees farenheit, and an ambient temperature of 80 degrees farenheit. The difference table is preferably a two-dimensional table with six columns and six rows.

At 203, the steady state difference value is adjusted to account for the vehicle speed, ambient temperature and actual engine coolant temperature, to generate a steady state oil temperature value OILT_SS. Steady state oil temperature value OILT_SS is determined as a function of the steady state difference value, an engine coolant temperature value ECT, which is indicative of the temperature of the engine coolant, and two additional values FNXXB(ECT) and FNXXC(INFAMB, VSBAR) according to the relationship shown at 203. The value FNXXB(ECT) is indicative of higher heat transfer into the oil at lower engine coolant temperatures. The value FNXXXC(INFAMB_KAM, VSBAR) is indicative of a loss of heat via the oil pan and exposed engine parts due to ambient temperature. INFAMB_KAM, which is used as an index value in FNXXXC is stored in KAM 24 and is indicative of ambient air temperture. VSBAR which is also used as an index value in FNXXXC is indicative of vehicle speed.

At 204, an oil temperature time constant TC_OILT, which is indicative of the rate of change of oil temperature in the engine, is generated as a function of an airmass value AM. Airmass value AM is indicative of the mass flow rate of air into the intake manifold in pounds per minute as measured by MAF sensor 103. The value TC_OILT is preferably generated by retrieving a value from a time constant table which contains a plurality of empirically derived values indexed by airmass AM. Each of the oil temperature time constants stored in the time constant table is indicative of an empirically determined rate of change of temperature in the engine as a function of airmass.

At 205, an instantaneous oil temperature value OILT, which is indicative of the instantaneous temperature of the engine oil, is generated as a function of the steady state oil temperature value OILT_SS and the oil temperature time constant TC_OILT. OILT is advantageously generated by taking the rolling average of OILT_SS and TC_OILT. The value OILT is preferably stored in keep-alive memory for use during subsequent engine operation. The oil temperature routine is then exited at 206.

FIGS. 3(a), 3(b), 4(a) and 4(b) show the steps executed by EEC 10 to implement an oil change interval routine in order to provide an indication to a vehicle operator of the expiration of an oil change interval. As with the oil temperature routine of FIG. 2, the oil change interval routine is executed by the EEC as a portion of a background loop which executes substantially continuously, during engine operation.

The oil change interval routine is entered in FIG. 3(a) at 210 and at 211 an initialization flag INIT_FLG is checked to determine if the present execution of the background routine is the first time the background routine is being executed since the engine was turned on. INIT_FLG preferably has a value of zero before and during the initial execution of the background loop and a value of one thereafter.

If INIT_FLG is not equal to zero then the routine skips initialization step 212 and proceeds to step 213. Otherwise, at 212 an initial value for the engine oil temperature value OILT is calculated by first calculating a cooldown factor $e^{-t/TC}$, where t is a value indicative of an amount of time elapsed when the engine was turned off and is preferably generated from an engine-off time sensor which detects the amount of time for which the engine is turned off. TC is a calibratable time constant which is indicative of a rate at which engine oil cools when the engine is not running. The instantaneous oil temperature value OILT is then calculated as a function of the instantaneous oil temperature OILT stored in KAM before engine shutdown, as adjusted by ambient air temperature value INFAMB_KAM and the cooldown factor.

Figure 5:
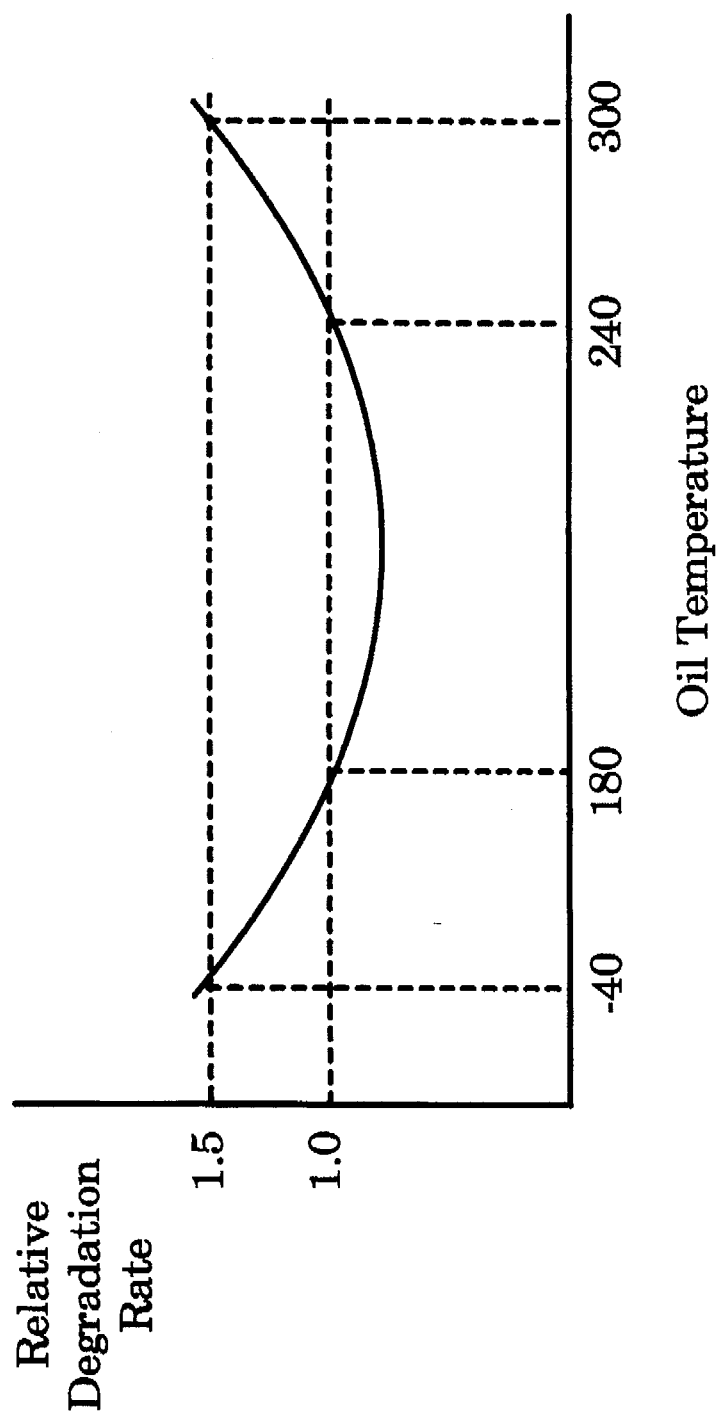
FIG. 5 is a graph showing the relationship of lubricating oil life to oil temperature.

At 213, an oil stress value OIL_LIFE_MUL which is indicative of a rate at which the oil degrades is calculated as a function of the instantaneous oil temperature value OILT. OIL_LIFE_MUL is advantageously determined by retrieving an oil stress value from an oil stress table which contains a plurality of oil stress values, each of which is indicative of an empirically determined rate of oil degradation at a particular oil temperature. As will be appreciated by those skilled in the art, in view of the present disclosure, oil degrades at different rates depending upon its temperature. FIG. 5 shows in graphical form, relative rates of oil degradation for different temperatures. In FIG. 5, oil temperature in degrees farenheit is given along the horizontal axis and the relative rate of degradation is given along the vertical axis. An oil degradation rate of 1.5 indicates a rate of degradation which is 50% greater than a degradation rate of 1.0 As can be seen in FIG. 5, oil which is at a temperature above 240 or below 180 degrades at a faster rate than oil which is between those temperatures. A preferred embodiment advantageously determines the expiration of an oil change interval as a function of the degradation rate, in order to more accurately inform a vehicle operator of the need for an oil change.

At 214, the oil quality value OIL_LIFE_REVS, which is indicative of the relative efficacy of the engine oil is calculated by modifying the present value of OIL_LIFE_REVS with the oil stress value and an engine revolution value ENGINE_REV which is indicative of the number of engine revolutions elapsed between the present execution of the oil change interval routine and the prior execution of the oil change interval routine. The value ENGINE_REV is calculated according to the following relationship:

$$ENGINE\_REV = N/60 * BG\_TMR$$

where,

N is the rotational speed of the engine in revolutions per minute; and

BG_TMR is a value which is indicative of the number of seconds elapsed between the present execution of the oil change interval routine and the prior execution of the oil change interval routine.

FIG. 3(b) shows the steps executed after step 214 in FIG. 3(a). At step 220, a KAM integrity value KAM_ERROR is checked to determine the integrity of the values stored in the KAM. Values stored in the KAM may become corrupted if power to the KAM is lost, such as by disconnecting the car battery from the vehicle electrical system. If KAM_ERROR equals one then the KAM values are determined to have been corrupted and at 221, a flag OILLT_BL_FLG is set to a value of one to enable a visual indication to the vehicle operator, via LED 143 that the automatic determination of an oil change interval is not possible. This indication is preferably given by causing the LED 143 to blink in a manner shown in FIGS. 4(a) and 4(b).

If KAM_ERROR does not equal one, then at 222 two comparisons are performed. First, initialization flag INIT_FLG is checked to determine if the present execution of the background routine is the first time the background routine is being executed since the engine was turned on. Second, the oil quality value OIL_LIFE_REVS is compared to a predetermined threshold value OIL_LIFE_MAX, which is indicative of a predetermined maximum oil life. If OIL_LIFE_REVS is greater than OIL_LIFE_MAX, and if INIT_FLG equals zero then at 223 an oil state flag OILLT_STATE is set to a value of one to enable a visual indication to the vehicle operator, via LED 143 that an oil change is required. The visual indication is only enabled if at 222, the vehicle is determined to be in startup. This is performed to avoid startling the vehicle operator. Turning on the visual indication for the first time at engine start-up has the additional advantage of giving the operator the opportunity to consult the vehicle owner manual.

At 224, an oil interval reset flag OIL_RESET is checked to determine if the vehicle operator has pushed the oil change reset button 150 to initiate a new oil change interval. The flag OIL_RESET has a value of one if the OIL_RESET button has been actuated by the driver to initiate a new oil change interval, and a value of zero otherwise. Once OIL_RESET is set to a value of one, it is reset to a value of zero at step 225.

If OIL_RESET equals a value of one then at 225, a plurality of values are initialized. OILLT_BL_FLG, OIL_LIFE_REV and OILLT_STATE are as described above, and OILLT_BL_TMR is an oil indicator blinking value which will be described in the description accompanying FIG. 4(a).

If OIL_RESET does not equal one, then at 226, OILLT_BL_FLG is tested and if it equals a value of one, then at 227, an oil indicator blinking routine is executed. Otherwise the oil change interval routine is exited at 228.

FIG. 4(a) shows the steps executed by EEC 10 to implement the oil indicator blinking routine shown at 227 which causes the visual indicator 143 to indicate to the vehicle operator that an automatic determination of an oil change interval is not possible. The routine is initiated at 301 and at 302 the value of INIT_FLG is checked. If INIT_FLG equals one, indicating that the background loop has already been executed once, then at 303, oil indicator timer value OILLT_BL_TMR which contains a value indicative of an amount of time the visual indicator has been blinking, is initialized to a value of zero, and the routine proceeds to step 305. If INIT_FLG is not equal to a value of one at 302, then at 304, OILLT_BL_TMR is incremented by a calibratable increment value OILLT_BL_STP which is indicative of a predetermined amount by which OILLT_BL_TMR should be incremented per background loop. Once incremented, OILLT_BL_TMR is compared to a maximum timer value, and if the value of OILLT_BL_TMR is greater than the maximum timer value then OILLT_BL_TMR is clipped to equal the maximum timer value. In a preferred embodiment the maximum timer value has a value of 255. At 305, OILL_BL_TMR is compared to a maximum timer value OILLT_BL_MAX and if OILLT_BL_TMR is less than OILLT_BL_MAX, indicating that the visual indicating blinking period has not expired, then at 306, the visual indicator is lit by executing a lighting routine shown in FIG. 4(b). Otherwise, the visual indicator blinking period is determined to have expired and the routine is exited at 307.

FIG. 4(b) shows the steps executed by EEC 10 to implement the lighting routine shown at 306. The routine is initiated at 321, and at 322 an LED timer value OILLT_B2_TMR is incremented by BG_TMR. At 323, OILLT_B2_TMR is compared against a predetermined maximum on timer value OILLT_BL_T1, and if OILLT_B2_TMR is less than OILLT_BL_T1 then at 324 OILLT_STATE is set to a value of one to energize LED 143. At 325, OILLT_B2_TMR is compared against a maximum off timer value OILLT_BL_T2.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A method of determining an oil temperature value which is indicative of the temperature of lubricating oil within an internal combustion engine in a vehicle, comprising the steps of:

determining a steady state oil temperature value as a function of an engine speed value which is indicative of the rotational speed of the engine, and an aircharge value which is indicative of an aircharge being drawn into the engine;

determining, as a function of the aircharge value, a time constant value which is indicative of the rate of change of temperature in the engine; and determining the temperature of said oil as a function of said steady state oil temperature value and said time constant value.

2. The method as set forth in claim 1 comprising the further step of determining said oil temperature value upon engine start-up by retrieving an oil temperature value generated before shut-down of the engine, and determining said oil temperature value upon engine start-up as a function of said oil temperature value generated before shut-down of said engine, an ambient temperature value indicative of ambient temperature, and a timer value indicative of an amount of time elapsed between said engine shut-down and said engine start-up.

3. The method asset forth in claim 1 wherein the step of determining said steady state oil temperature value comprises the steps of:

determining a steady state difference value as a function of the difference between a previous steady state oil temperature value and an engine coolant temperature value; and modifying said steady state difference value by a heat transfer value, which is indicative of a rate of heat transfer out of an oil pan and other exposed engine surfaces, to determine said steady state oil temperature value.

4. The method as set forth in claim 1 wherein the steady state oil temperature value is additionally determined as a function of a temperature loss value which is indicative of a loss of heat via the oil pan and exposed engine parts due to ambient temperature.

5. The method as set forth in claim 4 wherein the temperature loss value is generated by the steps of:

determining an ambient temperature value indicative of ambient air temperature;

determining a vehicle speed value indicative of the speed of the vehicle;

retrieving, as a function of said ambient temperature value and said vehicle speed value, said temperature loss value from a table which contains a plurality of temperature loss values indexed by vehicle speed and ambient temperature.

6. The method as set forth in claim 1 wherein the engine includes an oil change indicator which provides an operator of the vehicle of the expiration of an oil change interval, and a means for generating an oil change reset signal which causes initiation of said oil change interval, the method comprising the additional steps of:

(i) responding to said oil change reset signal by initializing an oil quality value which is indicative of the lubricating quality of said oil;

(ii) generating, as a function of the temperature of said oil, an oil stress value which is indicative of a rate at which the oil degrades;

(iii) generating an oil use value as a function of said oil stress value and an engine revolution value;

(iv) modifying said oil quality value by adding said oil use value to said oil quality value;

(v) comparing said modified oil quality value to a predetermined quality value, which is indicative of a predetermined maximum oil life;

(vi) providing a first indication to said vehicle operator if said modified oil quality value indicates an effective oil life which is greater than an oil life indicated by said predetermined quality value; and (vii) periodically repeating the steps (ii)–(vi) during operation of said engine, said engine revolution value being indicative of a number of engine revolutions elapsed between execution of the steps (ii)–(vi) and the prior execution of the steps (ii)–(vi).

7. In a vehicle which includes oil for lubricating engine components, an oil change indicator which provides an operator of the vehicle of the expiration of an oil change interval, and a means for generating an oil change reset signal which causes initiation of said oil change interval, a method for informing an operator of the vehicle of the expiration of said oil change interval, comprising, the steps (i) responding to said oil change reset signal by initializing an oil quality value which is indicative of the lubricating quality of said oil;

(ii) inferring the temperature of said oil as a function of the rotational speed of the engine, aircharge entering an intake manifold of the engine, and engine coolant temperature;

(iii) generating, as a function of said oil temperature, an oil stress value which is indicative of a rate at which the oil degrades;

(iv) generating an oil use value as a function of said oil stress value and an engine revolution value;

(v) modifying said oil quality value by adding said oil use value to said oil quality value;

(vi) comparing said modified oil quality value to a predetermined quality value, which is indicative of a predetermined maximum oil life;

(vii) providing a first indication to said vehicle operator if said modified oil quality value indicates an effective oil life which is greater than an oil life indicated by said predetermined quality value; and (viii) periodically repeating steps (ii)–(vii) during operation of said engine, said engine revolution value being indicative of a number of engine revolutions elapsed between execution of the steps (ii)–(vii) and the subsequent execution of the steps (ii)–(vii).

8. The method as set forth in claim 7 wherein the step of inferring the temperature of said oil comprises the steps of:

determining a steady state oil temperature value which is indicative of the steady state temperature of said oil as a function of the rotational speed of the engine and said aircharge entering the intake manifold of the engine;

determining as a function of said aircharge a time constant value which is indicative of a rate of heat being generated by the engine; and inferring of the temperature of said oil as a function of said steady state oil temperature value and said time constant value.

9. In a vehicle which includes lubricating oil for lubricating engine components, an oil change indicator which provides an operator of the vehicle of the expiration of an oil change interval, and a means for generating an oil change reset signal which causes initiation of said oil change interval, a system for informing an operator of the vehicle of the expiration of said oil change interval, comprising, in combination:

means for initializing an oil quality value, which is indicative of the efficacy of said oil;

means for inferring the temperature of said oil as a function of a first value indicative of the rotational speed of the engine, a second value indicative of aircharge entering an intake manifold of the engine, and a third value indicative of engine coolant temperature; and means for periodically altering, upon the passage of a variable number of engine revolutions, said oil quality value, comprising, means, responsive to said oil temperature for generating an oil stress value which is indicative of a rate at which the oil degrades;

means for altering said oil quality value as a function of said oil stress value and a value indicative of said variable number of engine revolutions;

means for comparing said altered oil quality value to a predetermined quality value, which is indicative of a predetermined maximum oil life; and means for providing a first indication to said vehicle operator if said altered oil quality value indicates an effective oil life which is greater than an oil life indicated by said predetermined quality value.

10. The system as set forth in claim 9 wherein said means for generating an oil quality value comprises means for storing the oil quality value in a keep-alive memory, said keep-alive memory receiving power from a battery and retaining information during periods when the engine is shut down, the invention further comprising means, responsive to a loss of power to said keep-alive memory, for providing a second indication to the vehicle operator, which is indicative of a corruption of the oil change interval.

11. The system as set forth in claim 10 further comprising means, operable by said vehicle operator, for clearing said second indication.

12. The system as set forth in claim 9 wherein the means for determining the temperature of said oil comprises:

means, responsive to said first value and to said second value, for determining a value which is indicative of the steady state temperature of said oil;

means, responsive to said second value, for generating a time constant value which is indicative of a rate of heat being generated by the engine; and means for determining the temperature of said oil as a function of said steady state oil temperature value and said time constant value.

* * * * *